United States Patent [19]

Band et al.

[11] Patent Number: 4,483,079
[45] Date of Patent: Nov. 20, 1984

[54] COORDINATE MEASURING APPARATUS

[75] Inventors: Gerhard Band, Oberndorf; Hans-Jurgen Nösges, Rottweil; Günther Ross, Oberndorf, all of Fed. Rep. of Germany

[73] Assignee: Mauser-Werke Oberndorf GmbH, Fed. Rep. of Germany

[21] Appl. No.: 448,337

[22] Filed: Dec. 9, 1982

[30] Foreign Application Priority Data

Dec. 16, 1981 [DE] Fed. Rep. of Germany ....... 8136664

[51] Int. Cl.$^3$ ............................ G01B 5/03; G01B 7/03
[52] U.S. Cl. .................................... 33/174 L; 33/1 M
[58] Field of Search ............... 33/1 M, 174 L, 174 P, 33/174 PC, 174 TA, 174 TD

[56] References Cited

U.S. PATENT DOCUMENTS

| | | | |
|---|---|---|---|
| 3,594,908 | 7/1971 | Pagella | 33/174 L |
| 3,624,910 | 12/1971 | Farrand | 33/1 M |
| 3,774,311 | 11/1973 | Stemple | 33/1 M |
| 3,831,283 | 8/1974 | Pagella et al. | 33/174 TA |
| 4,138,822 | 2/1979 | Parodi | 33/174 L |
| 4,155,173 | 5/1979 | Sprandel | 33/1 M |
| 4,255,862 | 3/1981 | Nakamura | 33/174 L |

FOREIGN PATENT DOCUMENTS

| | | | |
|---|---|---|---|
| 668805 | 2/1966 | Belgium | 33/1 M |
| 1174117 | 3/1959 | France | 33/174 PC |

Primary Examiner—Richard R. Stearns
Attorney, Agent, or Firm—McGlew and Tuttle

[57] ABSTRACT

A coordinate measuring apparatus comprises a frame substantially formed by a rectangular prismatic body and an indexing rotary table which is connected to the front side portion of the prismatic body to form an L-shaped structure. Above the prismatic body, a cantilever arm projects over the rotary table. The cantilever arm is movable at its level, perpendicularly to its longitudinal axis and carries a tail spindle which is equipped with a measuring head. The clear construction of the apparatus which is easy to survey and with its overhead guideways, is an ideal arrangement for applying a linear measuring system.

11 Claims, 3 Drawing Figures

COORDINATE MEASURING APPARATUS

FIELD AND BACKGROUND OF THE INVENTION

The present invention relates in general to fabrication equipment and in particular to a new and useful coordinate measuring apparatus which permits rapid and accurate measurement of a workpiece while maintaining maximum accessability to the workpiece.

The growing use of numerical control for machining operations with complex machining patterns has made it possible to provide even an individual or small-to-medium scale series manufacture (mass production) of prismatic workpieces. The requirements on high quality of the products entail the difficult problem of measuring the workpiece in a way which is fast and reliable and can be performed with universal measuring means. Another requirement is the detection of imperfections in machining, as far as possible, instantly after the respective operations, to introduce a compensation during the following steps.

In the course of the last years, the coordinate measuring technique has proven to be an irreplacable and economical system. To make such a technique more flexible, however, certain features still require improvement. This particularly applies to a shortening of the start-up and auxiliary times, an increase in the measuring speed and compatibility and interlinkage with machine tools.

SUMMARY OF THE INVENTION

The present invention is directed to a coordinate measuring apparatus with which, in terms of a design which is satisfactory under workshop conditions of manufacture, many possibilities of interlinking with working machines and a high flexibility in combination are obtained, and sensitivity to contamination and temperature is eliminated. The apparatus of the invention also can operate at high speed and with high accuracy.

Accordingly an object of the present invention is to provide a coordinate measuring apparatus comprising a main body having a top portion and a front surface, a rotatable table having a base connected to and extending forwardly from said body at a lower end of the front surface thereof, a cantilever arm having a longitudinal axis and movably mounted to the top portion of the body for movement along an X-axis of a measuring coordinate system across the top portion and transversely to the longitudinal axis of the arm, the arm extending from the body at right angles to the front surface of the body and having a free end over the table at a spaced location from the table, a tail spindle operatively connected to the front end of the arm, and means for moving the tail spindle with respect to the arm along Y and X axes mutually perpendicular to each other and to the X axis, the tail spindle carrying a measuring head thereon for measuring a workpiece on the table.

A further object of the invention is to provide such a coordinate measuring apparatus wherein the rotary table is numerically controlled and includes a crown gear tooth for rotation of the table.

A further object of the invention is to provide such an apparatus wherein three legs support the main body and the base of the table.

A still further object of the invention is to provide the coordinate measuring apparatus with drives for driving the cantilever arm with respect to the body and the tail spindle, in two directions with respect to the cantilever arm.

The positioning range along the X axis of the cantilever arm with respect to the body should be chosen to be larger than the movement, along the X axis and the Y axis, of the tail spindle with respect to the cantilever arm. This is so that the measuring head can be moved to reach inside measuring points of a prismatic workpiece on the rotary table.

Because of the sensitivity to contamination of guideways for slidably mounting the various movable parts of the apparatus, the guideways are all provided above the rotary table and where possible under covers.

A further object of the invention is to provide such an apparatus which includes incremental linear measuring strips with opto-electronic reading devices on the main body and the cantilever arm as well as on the tail spindle or the cover thereof for measuring dimensions of a workpiece on the rotary table.

To insure the simple operation and rapid evaluation of the results of measurement, the apparatus can also be provided with an operating console and a terminal unit as well as with a control and measured data evaluating system.

To avoid inaccuracies caused by thermal stresses and the like, the indexing rotary table, body, arm, tail spindle, as well as the guides and drives, should be made of the same material and preferably steel.

A further object of the invention is to provide a coordinate measuring apparatus which is simple in design, rugged in construction and economical to manufacture.

A coordinate measuring apparatus in accordance with the invention has the advantage, particularly, that a clear construction which is easy to survey is obtained having a stable frame and overhead guideways, and permitting an ideal arrangement of the linear measuring systems. All supporting elements are welded, virtually non-warping, steel structures. The guideways, designed with rotary ball shoes, are covered, and this combination ensures a long life due to the self-cleaning effect of such guideways. The pneumatic NC controlled indexing rotary table, which is rack-toothed for positioning, ensures a high accuracy in thrust, rotation and spacing. The entire apparatus is supported at three points in a statically determinate manner and does not require a foundation under normal conditions. The many possibilities of linking the apparatus to working machines are ensured by the fact that in the inventive design, with the cantilever arm, the workpieces to be measured can be introduced from three sides.

Due to the combination of the system of coordinate measuring with a rotary table, a great flexibility in operation is obtained since the workpiece can simply be introduced in its optimum position. This makes it further possible to employ simple measuring pins which can serve a variety of measuring purposes. A quick workpiece change may be achieved by providing pallets in standby position. The operator's work may be simplified by providing an operating console and a terminal unit for monitored control, permitting a manual jig-assisted, or automatic operation of the apparatus.

In connection with the control and data evaluating systems, a remote control and fast setting from one workpiece to the other are made possible. By providing a large memory capacity, programs for specific parts may rapidly be recalled. Due to a quick evaluation of the measuring points to obtain the results, and the automatic determination of the position of the rotary table, with a compensation for systematic indexing error and transformation of coordinates during the rotation of the indexing table, both a high measuring speed can be provided and the measuring operation can be performed by sectors, to minimize the overall time needed for positioning. The uniform use of steel for the frame, the cantilever arm, the rotary table, the tall spindle, and the guide and drive elements leads to a uniform expansion under varying temperatures and results in an effective temperature compensation. The placement of the covered drive elements and measuring systems at substantially the same level above the working space reduces the disturbing influence of non-uniform temperature distribution on the results of measurement and protects the component parts from contamination. The consequent separation of the guide elements from the workpiece support, whereby the respective forces are prevented from interacting within the apparatus, eliminates the disturbing effect of increased load from the workpiece and accessories on the guidance and dependability of measurement. The separation of the function of displacing the axes of the apparatus from the function of receiving the workpiece provides freedom in the integration of the coordinate measuring apparatus in the production flow. The integrated indexing rotary table is a workpiece receiving device which is well accessible to the operator and can easily be linked to the working equipment and, because of its high positioning accuracy and dynamic properties, is capable of turning the workpiece within a short time into the desired measuring position.

To make a manual or automatic transportation of workpieces from working machines to the coordinate measuring apparatus possible without reducing accessibility, the coordinate measuring apparatus is combined with the working machines into an interlinked operating system.

The various features of novelty which characterize the invention are pointed out with particularity in the claims annexed to and forming a part of theis disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

One embodiment of the invention is shown in the drawings in which.

DESCRIPTION OF THE PREFERRED EMBODIMENT

Figure 1:
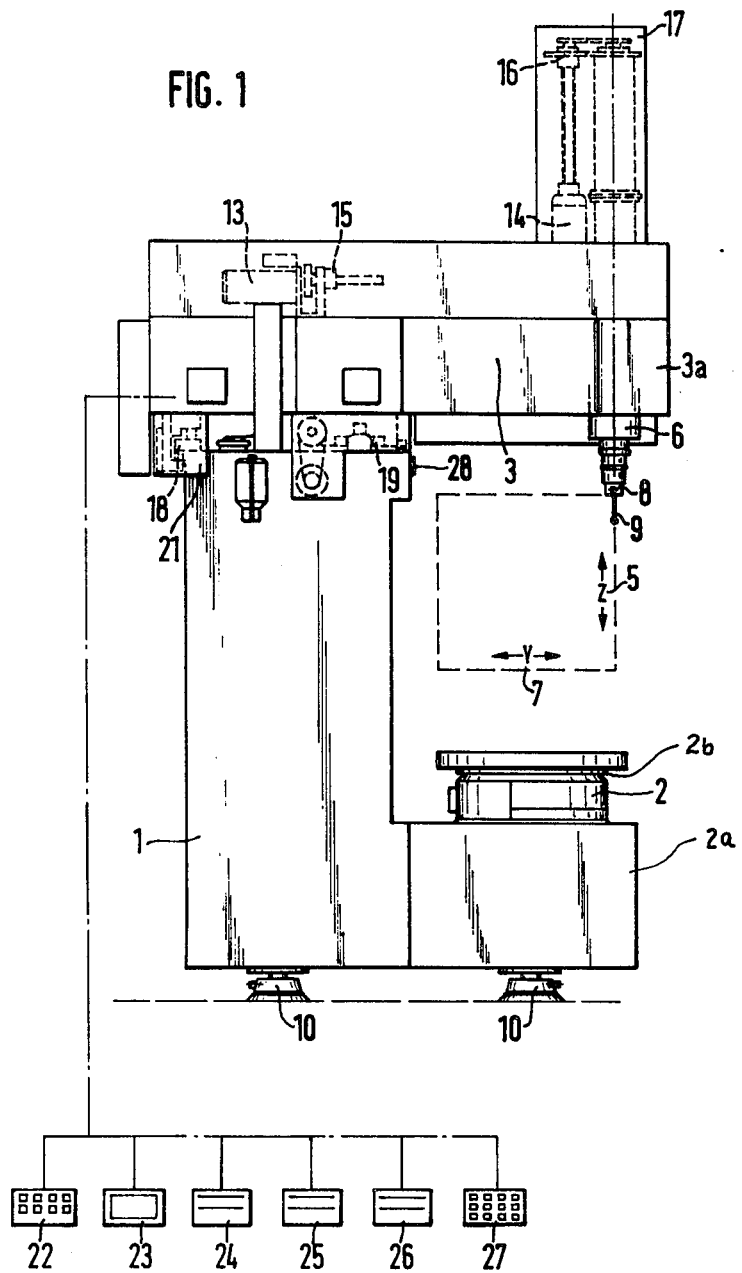
FIG. 1 is a side elevational view of the coordinate measuring apparatus.
Figure 2:
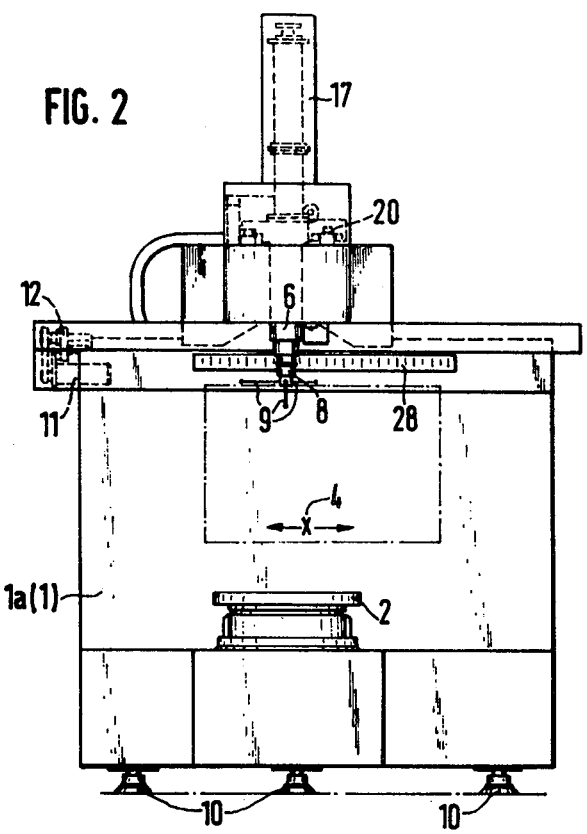
FIG. 2 is a front view corresponding to FIG. 1.
Figure 3:
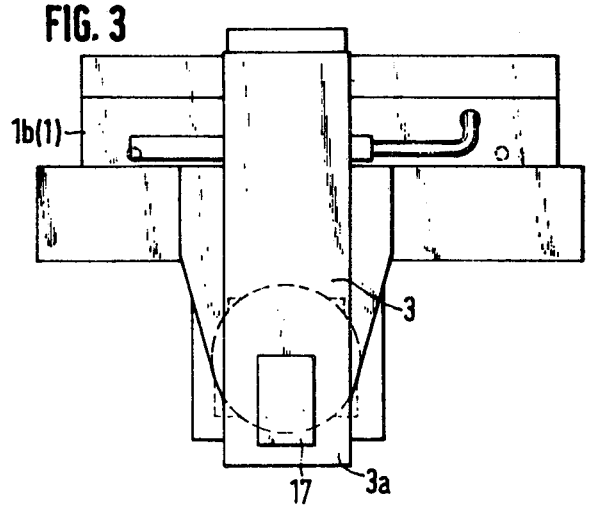
FIG. 3 is a top plan view corresponding to FIG. 1.

The frame of the coordinate measuring apparatus of the invention is formed substantially by a main rectangular prismatic body 1 made of steel. On the lower front side 1a of body 1, an indexing rotary table 2 having base 2a is formly connected to body 1, so that an L-shaped structure is formed. Table 2 forms a workpiece receiving device for the apparatus. On the top 1b of prismatic body 1, a cantilever arm 3 is mounted, extending at right angles to the front side 1a of the body 1 and projecting over rotary table 2 while being vertically spaced therefrom. Arm 3 is mounted for travelling in the coordinate x-axis direction 4, i.e. transversely to its longitudinal axis. On its free front end 3a, arm 3 carries a tail spindle 6 which extends in the coordinate z-axis direction 5. Table 2 has crown gear teeth for rotation thereof at 26.

Spindle 6 is also mounted for travelling parallel to the longitudinal axis of arm 3, in the coordinate y-axis direction 7. Carried on the end of spindle 6 is a measuring head 8 equipped with measuring pins 9 for taking measurements in the coordinate directions.

The apparatus is supported on three legs 10 in a statically determinate manner, one leg 10 being provided below rotary table 2 (specifically its base) and the other two legs 10 below prismatic body 1.

Cantilever arm 3 is moved in the x-coordinate direction 4 by means of a drive comprising a D.C. motor 11 and a frictional transmission or spindle drive 12 provided between prismatic body 1 and arm 3. Drive 12 can for example be a worm gear threaded into a portion of arm 3. The movements of tail spindle 6 in the y and z coordinate directions 5 and 7 are also effected by D.C. motors 13 and 14, again through frictional transmissions or spindle drives 15 and 16. The drive elements are accommodated in arm 3, in prismatic body 1, and in the cover 17 of tail spindle 6. The respective guides 18, 19 and 20 are protected from contamination by cover 17, by arm 3 and by a cover 21 of prismatic body 1.

Guides 18 and 19 are provided between the top portion of the main body 1 and the cantilever arm 3 for movement of the arm across the top of the main body in the x-axis direction. Guide 20 is provided between the arm 3 and the tail spindle 6 for movement of the tail spindle with respect to the arm in the y-axis direction. In known fashion, the spindle 16 or other suitably provided guide can provide guidance between the spindle 6 and the arm 3 in a vertical or z-axis direction.

The relative positions between the spindle, arm and body, can be measured using known optical-electrical elements in conjunction with measuring strips 28 (one of which is shown) extending along each of the x, y and z axes.

While the positioning ranges in the y and z coordinate directions 5, 7 are substantially equal to each other, the positioning range in the x coordinate direction 4 is large, in order to be able to reach, with the measuring pins 9, also inside measuring points of prismatic workpieces.

To ensure a simple control of the apparatus, an operating console 22 and a terminal unit 23 with a screen, as well as a control and data evaluating system comprising individual devices 24, 25 and 26 are associated therewith. One of the devices 24 may handle the data output, another device 25 the central control of the operation, and still another device 26 the evaluation of the measurements, with the evaluating system being a process control computer with peripheral equipment. For documentation, a printer 27 of measured data is provided in addition. These devices are all known and can be used advantageously with the invention.

Monitoring the operation on a screen facilitates the operator's work. The apparatus is controlled by the operator with the aid of a lightweight portable console 22.

In adaptable manufacturing systems, the coordinate measuring apparatus can form an important component of the quality inspection during the machining or forming operations. The construction and the date processing system satisfy all the requirements imposed on an integral flow of work and information.

While a specific embodiment of the invention has been shown and described in detail to illustrate the application of the principles of the invention, it will be understood that the invention may be embodied otherwise without departing from such principles.

What is claimed is:

1. A coordinate measuring apparatus comprising a frame, a workpiece receiving device, and a measuring head which is movable parallel to an x, y and z axis of a coordinate system and is equipped with measuring pins, the frame being formed by a substantially rectangular prismatic body (1) having front side (1a), the workpiece receiving device comprising an indexing rotary table (2) connected to the front side giving the frame an L-shape, a cantilever arm (3) spaced from and projecting above the rotary table and extending from a top (1b) of the prismatic body (1) at right angles to the front side (1a) thereof and mounted for travel on the prismatic body (1) in the direction of the coordinate x-axis and transversely to a longitudinal axis of the arm, the arm carrying on a free front end (3a) thereof a tail spindle which is movable in the vertical z-axis direction and in the y-axis direction of the coordinate system and is equipped with the measuring head.

2. A coordinate measuring apparatus according to claim 1, wherein the assembly of the prismatic body and the indexing rotary table is supported on a total of three legs (10).

3. A coordinate measuring apparatus according to claim 1, wherein a positioning range in the coordinate x-axis direction is wider than the positioning range in the coordinate z-axis and y-axis directions.

4. A coordinate measuring apparatus comprising:
a main body formed as a prismatic rectangle and having a top portion and a front face;
a rotary table having a base connected to and extending forwardly of said body at a lower end of said front face;
a cantilever arm having a longitudinal axis and movably mounted to said top portion of said main body for movement along an x-axis of a measuring coordinate system across said top portion and transversely to said longitudinal axis, said arm extending perpendicularly to said front face and having a front free end extending over and spaced above said rotary table;
a tail spindle operatively connected to said front end of said cantilever arm;
means for slidably guiding said spindle with respect to said arm along a y-axis and a z-axis of said measuring coordinate system which are mutually perpendicular to each other and perpendicular to said x-axis;
first drive means connected between said top portion of said main body and said cantilever arm for moving said cantilever arm along said x-axis;
second drive means connected between said cantilever arm and said tail spindle for moving said tail spindle along said y-axis; and third drive means connected between said tail spindle and said arm for moving said tail spindle along said z-axis.

5. An apparatus according to claim 4, including first guide means connected between said top portion of said main body and said cantilever arm, and extending in said x-axis for guiding said arm on said main body and second guide means connected between said cantilever arm and said tail spindle and extending in said y-axis for guiding said tail spindle on said arm in said y-axis, said x and y-axes being in horizontal planes and said z-axis being in a vertical plane.

6. An apparatus according to claim 5, wherein said first, second and third drive means, said first and second guide means, said rotary table, said tail spindle, said cantilever arm and said main body are made of the same material.

7. An apparatus according to claim 6, wherein said material is steel.

8. An apparatus according to claim 4, including an incremental linear measuring strip on at least one of said main body, cantilever arm and spindle extending respectively in one of said x, y and z axes, and an optoelectronic reading device associated with said strip for measuring respective positions of said tail spindle and rotary table.

9. An apparatus according to claim 4, including a measuring head having at least one measuring pin connected to the lower end of said tail spindle.

10. An apparatus according to claim 4, including an operatively connected console, terminal unit and control and measuring data inaugurating system.

11. A coordinate measuring apparatus comprising:
a main body formed as a prismatic rectangle and having a top portion and a front face;
a rotary table having a base connected to and extending forwardly of said body at a lower end of said front face;
a cantilever arm having a longitudinal axis and movably mounted to said top portion of said main body for movement along an x-axis of a measuring coordinate system across said top portion and transversely to said longitudinal axis, said arm extending perpendicularly to said front face and having a front free end extending over and spaced above said rotary table;
a tail spindle operatively connected to said front end of said cantilever arm;
means for slidably guiding said spindle with respect to said arm along a y-axis and a z-axis of said measuring coordinate system which are mutually perpendicular to each other and perpendicular to said x-axis; and
two spaced apart legs connected to a bottom of said main body at spaced locations on opposite sides of said table base and a third leg extending from a bottom of said table base for providing a three point support of said apparatus.

* * * * *